(12) United States Patent
Abedini et al.

(10) Patent No.: US 11,329,714 B1
(45) Date of Patent: May 10, 2022

(54) ANTENNA POLARIZATION CONFIGURATION FOR REPEATERS

(71) Applicant: QUALCOMM Incorporated, San Diego, CA (US)

(72) Inventors: Navid Abedini, Basking Ridge, NJ (US); Tao Luo, San Diego, CA (US); Ashwin Sampath, Skillman, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/248,643

(22) Filed: Feb. 1, 2021

(51) Int. Cl.
 *H04B 7/15* (2006.01)
 *H04B 7/155* (2006.01)

(52) U.S. Cl.
 CPC ....... *H04B 7/1555* (2013.01); *H04B 7/15521* (2013.01)

(58) Field of Classification Search
 CPC ... H04B 7/04; H04B 7/10; H04B 7/15; H04B 7/155; H04B 7/1555; H04B 7/15521; H04B 7/185
 See application file for complete search history.

(56) References Cited

U.S. PATENT DOCUMENTS

| | | | |
|---|---|---|---|
| 7,577,398 B2 * | 8/2009 | Judd | G01S 19/25 342/357.48 |
| 2017/0133759 A1 * | 5/2017 | Singh | H01Q 1/243 |
| 2020/0322037 A1 * | 10/2020 | Abedini | H04W 52/42 |
| 2020/0336168 A1 * | 10/2020 | Hormis | H04B 1/525 |
| 2020/0358501 A1 * | 11/2020 | Hormis | H04W 56/001 |
| 2020/0358518 A1 * | 11/2020 | Tarighat Mehrabani | H04B 7/15507 |

* cited by examiner

*Primary Examiner* — Blane J Jackson
(74) *Attorney, Agent, or Firm* — Harrity & Harrity, LLP

(57) ABSTRACT

Various aspects of the present disclosure generally relate to wireless communication. In some aspects, a wireless communication device, such as a repeater, may select a polarization configuration for multiple antennas that form beams for forwarding wireless communications between a first wireless device and a second wireless device. The repeater may forward wireless communications between the first wireless device and the second wireless device according to the polarization configuration. Numerous other aspects are described.

30 Claims, 9 Drawing Sheets

ANTENNA POLARIZATION CONFIGURATION FOR REPEATERS

FIELD OF THE DISCLOSURE

Aspects of the present disclosure generally relate to wireless communication and to techniques and apparatuses for configuring antenna polarization for repeaters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a wireless communication device (e.g., a repeater) includes selecting a polarization configuration for multiple antennas that form beams for forwarding wireless communications between a first wireless device and a second wireless device, and forwarding wireless communications between the first wireless device and the second wireless device according to the polarization configuration.

In some aspects, a method of wireless communication performed by a wireless communication device (e.g., a control node) includes generating a polarization configuration for a repeater with multiple antennas that are configured for directional beamforming with different polarizations, based at least in part on one or more of a capability of the repeater, or signal or channel conditions, and transmitting the polarization configuration to the repeater.

In some aspects, a wireless communication device (e.g., a repeater) for wireless communication includes a memory and one or more processors operatively coupled to the memory, the memory and the one or more processors configured to select a polarization configuration for multiple antennas that form beams for forwarding wireless communications between a first wireless device and a second wireless device, and forward wireless communications between the first wireless device and the second wireless device according to the polarization configuration.

In some aspects, a wireless communication device (e.g., a control node) for wireless communication includes a memory and one or more processors operatively coupled to the memory, the memory and the one or more processors configured to generate a polarization configuration for a repeater with multiple antennas that are configured for directional beamforming with different polarizations, based at least in part on one or more of a capability of the repeater, or signal or channel conditions, and transmit the polarization configuration to the repeater.

In some aspects, a non-transitory computer-readable medium storing a set of instructions for wireless communication includes one or more instructions that, when executed by one or more processors of a wireless communication device, cause the wireless communication device to select a polarization configuration for multiple antennas that form beams for forwarding wireless communications between a first wireless device and a second wireless device, and forward wireless communications between the first wireless device and the second wireless device according to the polarization configuration.

In some aspects, a non-transitory computer-readable medium storing a set of instructions for wireless communication includes one or more instructions that, when executed by one or more processors of a wireless communication device, cause the wireless communication device to generate a polarization configuration for a repeater with multiple antennas that are configured for directional beamforming with different polarizations, based at least in part on one or more of a capability of the repeater, or signal or channel conditions, and transmit the polarization configuration to the repeater.

In some aspects, an apparatus for wireless communication includes means for selecting a polarization configuration for multiple antennas that form beams for forwarding wireless communications between a first wireless device and a second wireless device, and means for forwarding wireless communications between the first wireless device and the second wireless device according to the polarization configuration.

In some aspects, an apparatus for wireless communication includes means for generating a polarization configuration for a repeater with multiple antennas that are configured for directional beamforming with different polarizations, based at least in part on one or more of a capability of the repeater, or signal or channel conditions, and means for transmitting the polarization configuration to the repeater.

Aspects generally include a method, apparatus, system, computer program product, non-transitory computer-readable medium, user equipment, base station, wireless communication device, repeater, control node, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
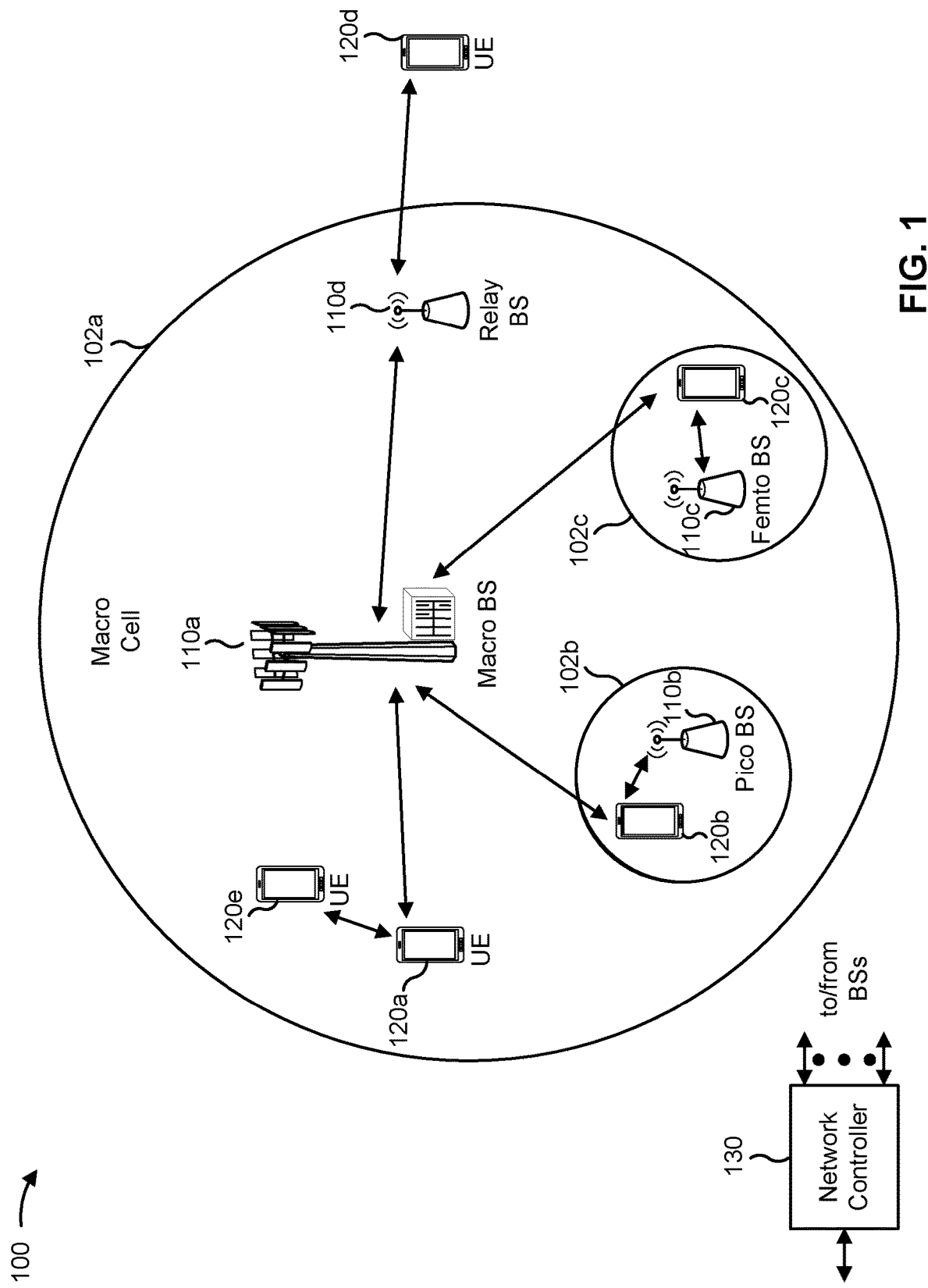
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
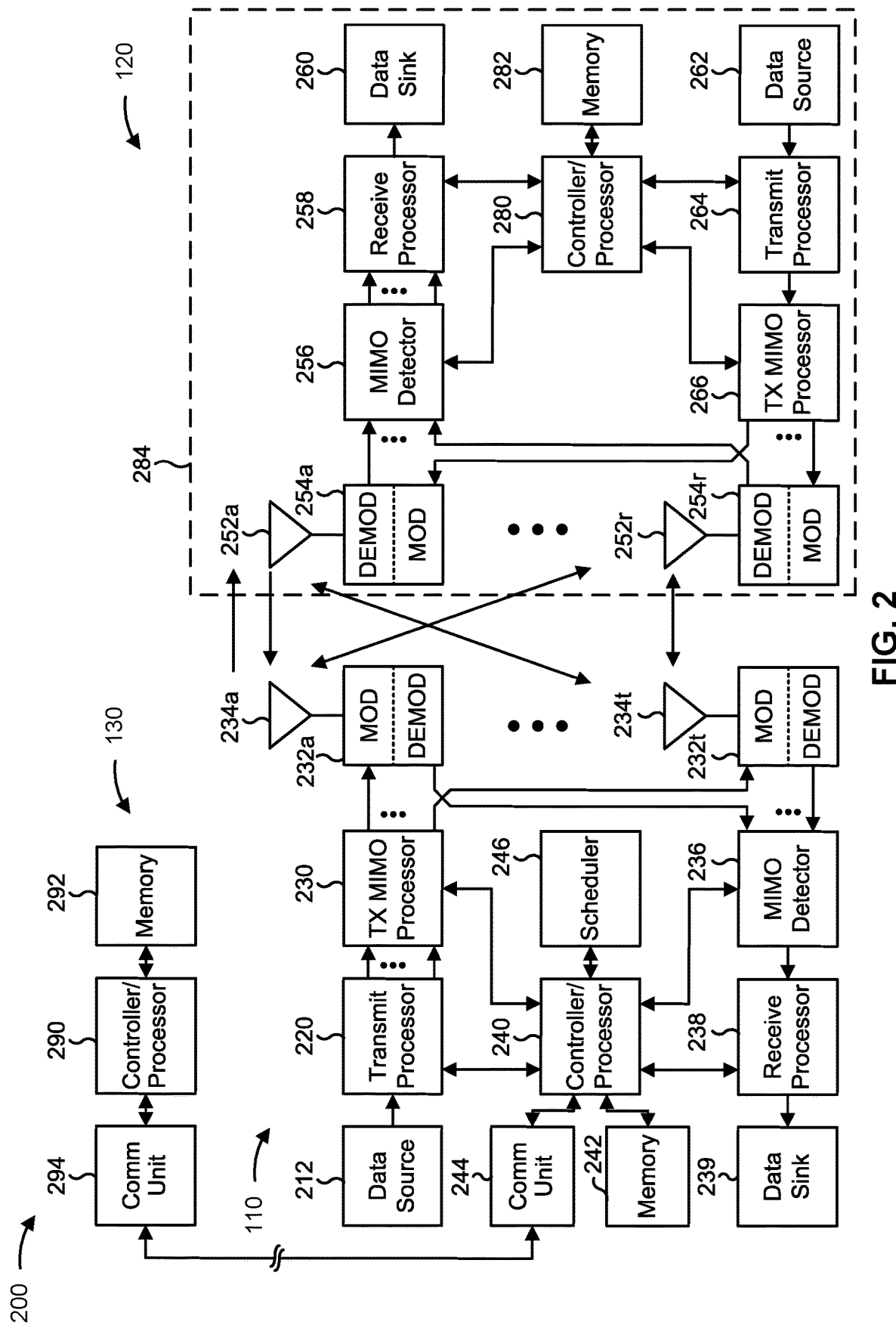
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 1-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 1-9.

Controller/processor 240 of base station 110, controller/processor 280 of UE 120, a controller/processor of a wireless communication device operating as an analog or digital repeater that amplifies and forwards signals, and/or any other component(s) of FIG. 2 may perform one or more techniques associated with configuring antenna polarization for repeaters, as described in more detail elsewhere herein. The wireless communication device that operates as a repeater may include some of the components as described herein for UE 120, such as a controller/processor, a transceiver, and/or multiple antennas (antenna panels for beamforming). For example, controller/processor 240 of base station 110, controller/processor 280 of UE 120, a controller/processor of the wireless communication device, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of base station 110, UE 120, and/or the wireless communication device may cause the one or more processors, UE 120, the wireless communication device, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

In some aspects, a wireless communication device operating as a repeater includes means for selecting a polarization configuration for multiple antennas that form beams for forwarding wireless communications between a first wireless device and a second wireless device, and/or means for forwarding wireless communications between the first wireless device and the second wireless device according to the polarization configuration. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, or memory 242.

In some aspects, the wireless communication device includes means for receiving an indication of the polarization configuration from a control node, where the selecting is based at least in part on the indication.

In some aspects, the wireless communication device includes means for transmitting or receiving an indication that the signal or channel conditions do not satisfy the threshold.

In some aspects, the wireless communication device includes means for receiving the wireless communications on one of the horizontal chain or the vertical chain, and/or means for transmitting the wireless communications on both the horizontal chain and the vertical chain.

In some aspects, the wireless communication device includes means for receiving the wireless communications on both the horizontal chain and the vertical chain, and/or means for transmitting the wireless communications on one of the horizontal chain or the vertical chain.

In some aspects, the wireless communication device includes means for receiving the wireless communications in a single layer on both the horizontal chain and the vertical chain, and/or means for transmitting the wireless communications for the single layer on both the horizontal chain and the vertical chain.

In some aspects, the wireless communication device includes means for receiving the wireless communications in a first signal on the horizontal chain and in a second signal on the vertical chain, and/or means for transmitting the wireless communications of the first signal on the vertical chain and of the second signal on the horizontal chain.

In some aspects, the wireless communication device includes means for transmitting an indication of a capability of the wireless communication device for configuring polarized antennas.

In some aspects, a wireless communication device operating as a control node includes means for generating a polarization configuration for a repeater with multiple antennas that are configured for directional beamforming with different polarizations, based at least in part on one or more of a capability of the repeater, or signal or channel conditions, and/or means for transmitting the polarization configuration to the repeater. In some aspects, the means for the wireless communication device to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246. In some aspects, the means for the wireless communication device to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the wireless communication device includes means for receiving an indication of a capability of the repeater for configuring polarized antennas.

As indicated above, FIG. 2 is provided as an example. Other examples may differ from what is described with regard to FIG. 2.

Figure 3:
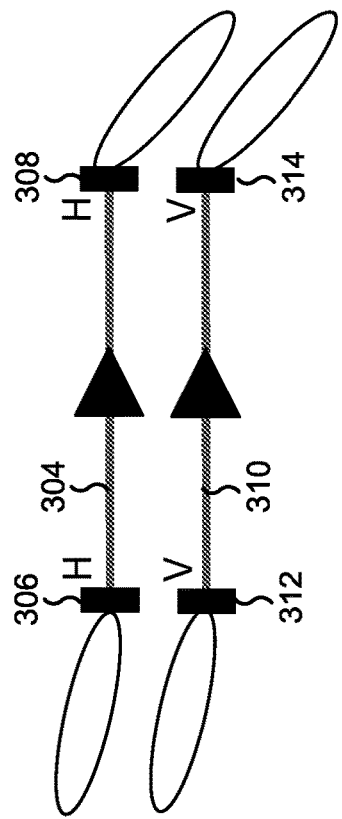
FIG. 3 is a diagram illustrating examples of polarization configurations for a repeater with polarized antennas, in accordance with the present disclosure.
Figure 3:
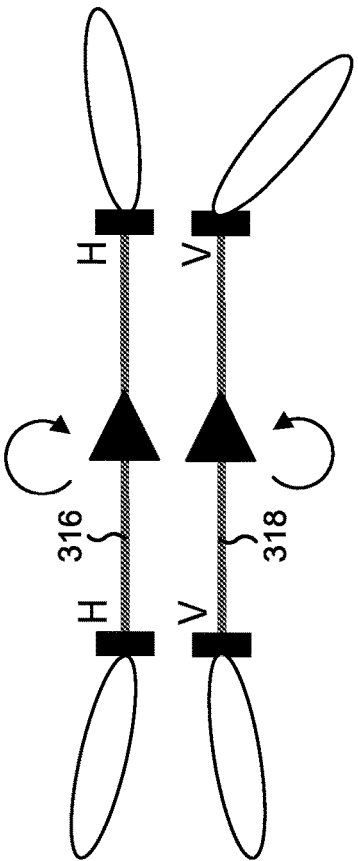

FIG. 3 is a diagram illustrating examples 300 and 302 of polarization configurations for a repeater with polarized antennas, in accordance with the present disclosure.

Repeaters may increase the reliability and capacity of a wireless network by extending network coverage and providing spatial diversity. The repeaters may be analog repeaters that forward wireless communications by receiving a signal, amplifying the signal, and transmitting the amplified signal. In general, there may be traditional repeaters that have a fixed configuration at the time of deployment and smart repeaters that can be dynamically configured after deployment. A smart repeater may be dynamically configured by a control node. The smart repeater may also learn repeater properties for certain conditions and autonomously configure itself. A configuration of a repeater may include a power setting, transmit beams, receive beams, and/or a forwarding direction for uplink or downlink.

Repeaters that are deployed in LTE networks do not account for directional beamforming and would not be effective for 5G. If a 5G network does not utilize repeaters, coverage enhancement may require added complexity and cost. Furthermore, weak signals may degrade communications for some UEs, and degraded communications waste power, processing resources, and signaling resources.

According to various aspects described herein, a repeater for 5G may be configured for directional beamforming, including for multiple polarizations (e.g., horizontal polarization, vertical polarization). Example 300 shows a repeater with at least one horizontal chain 304 that includes a horizontal (H) receive antenna 306 and a horizontal (H) transmit antenna 308. The repeater also has at least one vertical chain 310 that includes a vertical (V) receive antenna 312 and a vertical (V) transmit antenna 314. Each chain may include an amplifier and one or more filters for amplifying and filtering a received signal. The repeater may include 2N receive antennas and 2M (e.g., M=/V) transmit antennas. Each antenna may include an antenna panel for directional beamforming for a specific polarization. Although example 300 shows only antennas 306, 308, 312, and 314, the repeater may include a set of one or more receive antennas and a set of one or more transmit antennas on each chain. Because of the orthogonality of the horizontal and vertical polarizations, the repeater may transmit two beams at the same time. Example 300 shows that the repeater may receive signals, from a first wireless device (e.g., a base station, a UE, another repeater, low power device), in a beam direction and transmit signals, to a second wireless device (e.g., a base station, a UE, another repeater, low power device), in the same beam direction. The same analog beams may be created on both the horizontal antennas and the vertical antennas, on both the receive side and the transmit side. In some aspects, the repeater does not generate its own content or signals, except to provide capability information or configuration-specific information to a control node. In some aspects, a UE may perform repeater functions.

Example 302 shows a repeater that is configured for different analog beams on different polarizations. The repeater has a horizontal chain 316 and a vertical chain 318. For example, the repeater may receive, with horizontal chain 316, a beam in one direction and transmit a beam in another direction. The repeater may receive, with vertical chain 318, a beam in one direction and transmit a beam in another direction. The beam directions for receiving may be different than the beam directions for transmitting. The beam directions for horizontal chain 316 may be different than the beam directions for vertical chain 318. In some aspects, a polarization configuration may configure a vertical receive antenna to have a different beam direction than a horizontal receive antenna, or a vertical transmit antenna to have a different beam direction than a horizontal transmit antenna.

In some aspects, the repeater may transmit an indication of a capability of the repeater for directional beamforming for different polarizations. The network (e.g., a control node, a distributed unit) may, based at least in part on the capability of the repeater, transmit a polarization configuration that indicates different receive and transmit beam directions for different polarizations. For example, the polarization configuration may indicate beam directions for horizontal and vertical receive antennas and beam directions for horizontal and vertical transmit antennas. The polarization configuration may also include conditions, thresholds, and/or power settings for horizontal chain 316 and vertical chain 318.

As shown by reference number 320, the repeater may select a polarization configuration. In some aspects, the repeater may select the polarization configuration according to an indication of the polarization configuration that the repeater receives from a control node or another repeater. Alternatively, or additionally, the repeater may measure signals, evaluate channel conditions, or receive information about signal or channel conditions of links for wireless communications. The repeater may select the polarization configuration based at least in part on signal or channel conditions, including whether the signal or channel conditions satisfy a threshold (e.g., a signal strength threshold, a signal to noise ratio (SNR) threshold, a channel availability threshold). The control node may also select a polarization configuration based on signal or channel conditions.

As shown by reference number 325, the repeater may forward wireless communications according to the polarization configuration. This may include configuring beams for each of the antennas according to the polarization configuration, receiving signals, amplifying the signals, and transmitting the signals. The repeater may optionally filter the signals.

By configuring polarized antennas of a repeater for directional beamforming, the repeater may improve network performance and increase reliability by providing link diversity and phase diversity for forwarding wireless communications.

As indicated above, FIG. 3 provides some examples. Other examples may differ from what is described with respect to FIG. 3.

Figure 4:
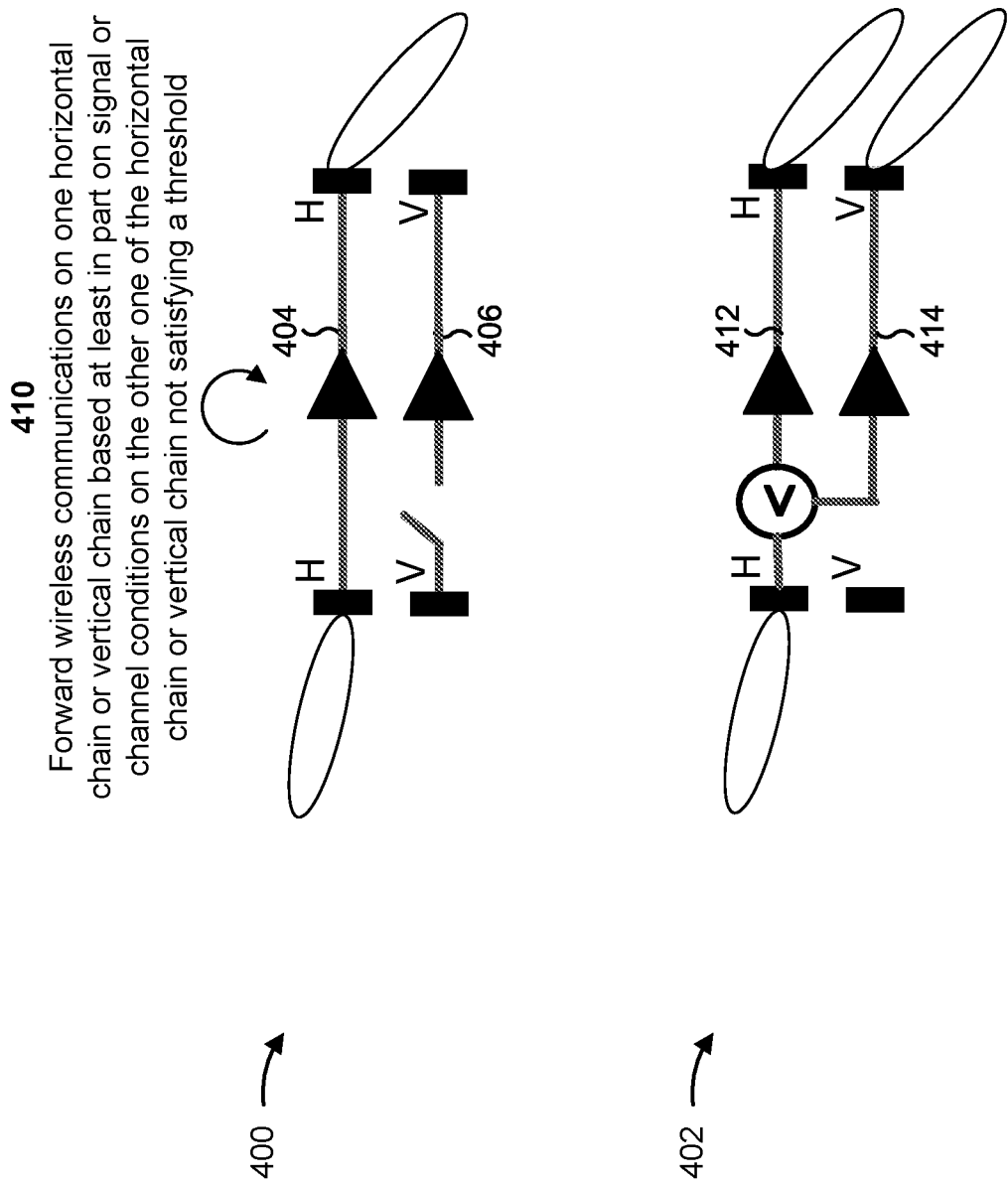
FIG. 4 is a diagram illustrating examples of polarization configurations for a repeater with polarized antennas, in accordance with the present disclosure.

FIG. 4 is a diagram illustrating examples 400 and 402 of polarization configurations for a repeater with polarized antennas, in accordance with the present disclosure.

Example 400 shows a repeater with a horizontal chain 404 and a vertical chain 406. As shown by reference number 410, the repeater may forward wireless communications on only one chain based at least in part on signal or channel conditions on the other chain not satisfying a threshold (e.g., an SNR threshold). For example, the repeater may receive wireless communications on a horizontal receive antenna and forward the wireless communications on a horizontal transmit antenna, but not use vertical chain 406 because of noise on the channel for that polarization. If vertical chain 406 is used, the repeater may be amplifying and forwarding more noise. The signal may also be too weak. Vertical chain 406 may be turned off.

In some aspects, a control node may transmit a polarization configuration that specifies that one of the chains, such as vertical chain 406, is not to be used for transmissions. The control node may also schedule a UE to not send a signal with a vertical polarization. If the repeater is a smart repeater, the repeater may decide to not use a chain and transmit an indication of the decision to the control node.

Example 402 shows a repeater with a horizontal chain 412 and a vertical chain 414. The repeater may receive wireless communications on one receive antenna but transmit the wireless communications on both transmit antennas. This may improve a polarization diversity of a single signal, and the polarization configuration may be applicable to a single layer (rank). The repeater may select this polarization configuration based at least in part on feedback signaling.

As indicated above, FIG. 4 provides some examples. Other examples may differ from what is described with regard to FIG. 4.

Figure 5:
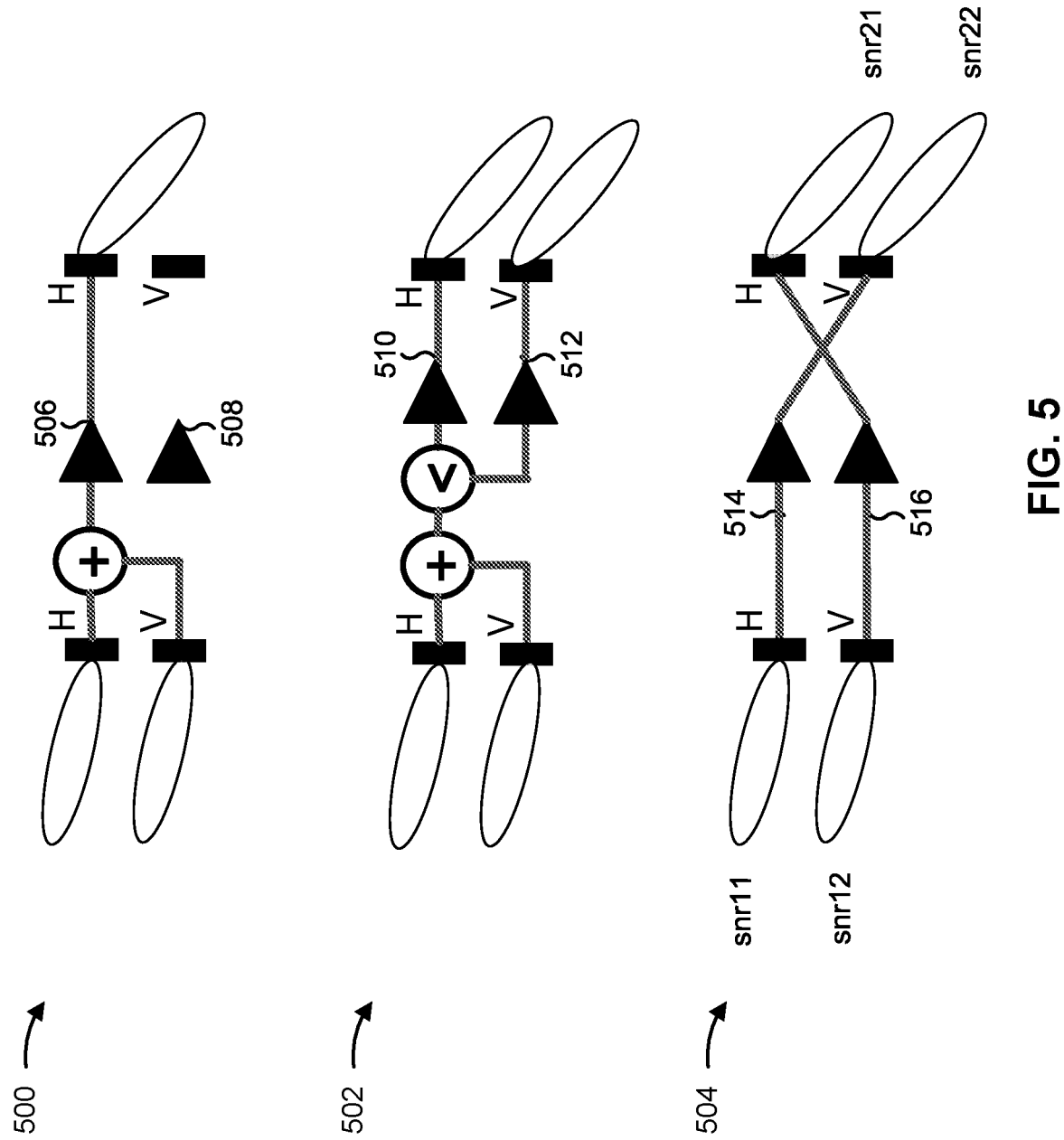
FIG. 5 is a diagram illustrating examples of polarization configurations for a repeater with polarized antennas, in accordance with the present disclosure.

FIG. 5 is a diagram illustrating examples 500, 502 and 504 of polarization configurations for a repeater with polarized antennas, in accordance with the present disclosure.

Example 500 shows a repeater with a horizontal chain 506 and a vertical chain 508. The repeater may combine signals for wireless communications that are received on both receive antennas and transmit the combined signal on a single transmit antenna. Example 500 shows the horizontal transmit antenna transmitting wireless communications received on both of the receive antennas. The repeater or a control node for the repeater may select this polarization configuration if channel conditions on a next hop do not satisfy a threshold for the other polarization. This may provide some diversity gain. For stable channel conditions, and in the presence of feedback (or prior measurements), the repeater may precode the transmission signals (e.g., with proper phase shifts) to maximize an effective end-to-end SNR. This polarization configuration may also be applicable to a single layer.

Example 502 shows a repeater with a horizontal chain 510 and a vertical chain 512. The repeater may receive incoming signals from both the horizontal receive antenna and the vertical receive antenna. The repeater may combine the incoming signals using a combiner that adds two incoming signals to generate an outgoing signal. In some aspects, the combiner may assign different weights (phase and/or amplitude) to the two signals when combining the two signals. The repeater may then transmit the combined signal on both the horizontal transmit antenna and the vertical transmit antenna. This may be applicable to a single layer.

Example 504 shows a repeater with a horizontal chain 514 and a vertical chain 516. The repeater may switch receive and transmit polarizations. That is, wireless communications received in one polarization are forwarded in another polarization. This may improve end-to-end performance by maximizing an end-to-end total capacity.

The capacity may be calculated as log(SNR1*SNR2), where SNR1 is an SNR for a first link and SNR2 is an SNR for a second link. In example 504, snr11 represents an SNR of an initial first link before the repeater, snr21 represent an SNR for the initial first link after the repeater, snr12 represents an SNR of an initial second link before the repeater, snr22 represents an SNR for the initial second link after the repeater. For a repeater that does not switch polarizations, SNR1 for link 1 may be a function (e.g., addition) of snr11 and snr21, and SNR1 for link 2 may be a function of snr12 and snr22. However, the repeater of example 504 may switch polarizations such that SNR1 is a function of snr11 and snr22, and SNR2 is a function of snr12 and snr21. This may improve capacity if the SNR for a particular link is lower for a particular polarization, which may be due to interference on the particular polarization. In other words, links may be optimized according to which polarizations are best for a particular hop.

As indicated above, FIG. 5 is provided as an example. Other examples may differ from what is described with regard to FIG. 5.

Rather than using the simple analog repeaters designed for LTE, 5G networks and other radio access technologies may enhance coverage with repeaters configured for polarized antennas and directional beamforming. By using one or more of the alternate polarization configurations discussed above in connection with FIGS. 3-5, link diversity and capacity for beamformed wireless communications may be improved.

Figure 6:
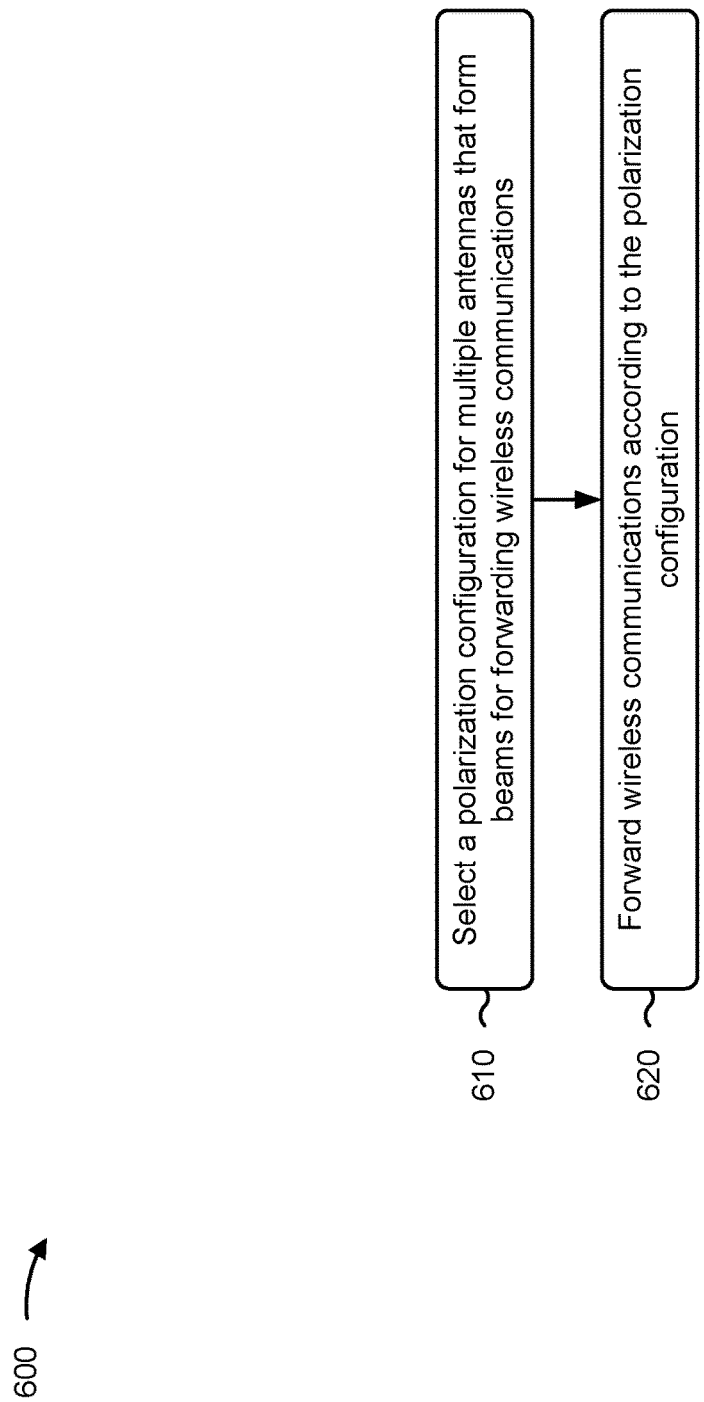
FIG. 6 is a diagram illustrating an example process performed, for example, by a wireless communication device, in accordance with the present disclosure.

FIG. 6 is a diagram illustrating an example process 600 performed, for example, by a wireless communication device, in accordance with the present disclosure. Example process 600 is an example where the wireless communication device (e.g., a repeater depicted in FIGS. 3-5, UE 120 depicted in FIGS. 1-2) performs operations associated with configuring antenna polarization for repeaters.

As shown in FIG. 6, in some aspects, process 600 may include selecting a polarization configuration for multiple antennas that form beams for forwarding wireless communications between a first wireless device and a second wireless device (block 610). For example, the wireless communication device (e.g., using forwarding component 808 depicted in FIG. 8) may select a polarization configuration for multiple antennas that form beams for forwarding wireless communications between a first wireless device and a second wireless device, as described above.

As further shown in FIG. 6, in some aspects, process 600 may include forwarding wireless communications between the first wireless device and the second wireless device according to the polarization configuration (block 620). For example, the wireless communication device (e.g., using reception component 802, forwarding component 808, and transmission component 804 depicted in FIG. 8) may forward wireless communications between the first wireless device and the second wireless device according to the polarization configuration, as described above.

Process 600 may include additional aspects, such as any single aspect or any combination of aspects described below and/or in connection with one or more other processes described elsewhere herein.

In a first aspect, process 600 includes receiving an indication of the polarization configuration from a control node, where the selecting is based at least in part on the indication.

In a second aspect, alone or in combination with the first aspect, the wireless communication device determines the polarization configuration based at least in part on one or more of signal measurements or channel conditions.

In a third aspect, alone or in combination with one or more of the first and second aspects, the wireless communication device includes a horizontal chain that includes a horizontal receive antenna that forms a receive beam with a horizontal polarization and a horizontal transmit antenna that forms a transmit beam with the horizontal polarization, and a vertical chain that includes a vertical receive antenna that forms a receive beam with a vertical polarization and a vertical transmit antenna that forms a transmit beam with the vertical polarization, and forwarding the wireless communications includes forwarding the wireless communications using one or more of the horizontal chain or the vertical chain.

In a fourth aspect, alone or in combination with one or more of the first through third aspects, the polarization configuration configures the horizontal chain for different beam directions than for the vertical chain.

In a fifth aspect, alone or in combination with one or more of the first through fourth aspects, the polarization configuration configures one or more of the vertical receive antenna to have a different beam direction than the vertical transmit antenna, or the horizontal receive antenna to have a different beam direction than the horizontal transmit antenna. In some aspects, the polarization configuration configures one or more of the vertical receive antenna to have a different beam direction than the horizontal receive antenna, or the vertical transmit antenna to have a different beam direction than the horizontal transmit antenna.

In a sixth aspect, alone or in combination with one or more of the first through fifth aspects, forwarding the wireless communications includes forwarding the wireless communications on one of the horizontal chain or the vertical chain based at least in part on signal or channel conditions on the other one of the horizontal chain or vertical chain not satisfying a threshold.

In a seventh aspect, alone or in combination with one or more of the first through sixth aspects, process 600 includes transmitting or receiving an indication that the signal or channel conditions do not satisfy the threshold.

In an eighth aspect, alone or in combination with one or more of the first through seventh aspects, forwarding the wireless communications includes receiving the wireless communications on one of the horizontal chain or the vertical chain, and transmitting the wireless communications on both the horizontal chain and the vertical chain.

In a ninth aspect, alone or in combination with one or more of the first through eighth aspects, forwarding the wireless communications includes receiving the wireless communications on both the horizontal chain and the vertical chain and combining the wireless communications, and transmitting the combined wireless communications on one of the horizontal chain or the vertical chain.

In a tenth aspect, alone or in combination with one or more of the first through ninth aspects, forwarding the wireless communications includes receiving the wireless communications in a single layer on both the horizontal chain and the vertical chain, and transmitting the wireless communications for the single layer on both the horizontal chain and the vertical chain.

In an eleventh aspect, alone or in combination with one or more of the first through tenth aspects, forwarding the wireless communications includes receiving the wireless communications in a first signal on the horizontal chain and in a second signal on the vertical chain, and transmitting the wireless communications of the first signal on the vertical chain and of the second signal on the horizontal chain.

In a twelfth aspect, alone or in combination with one or more of the first through eleventh aspects, process 600 includes transmitting an indication of a capability of the wireless communication device for configuring polarized antennas.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
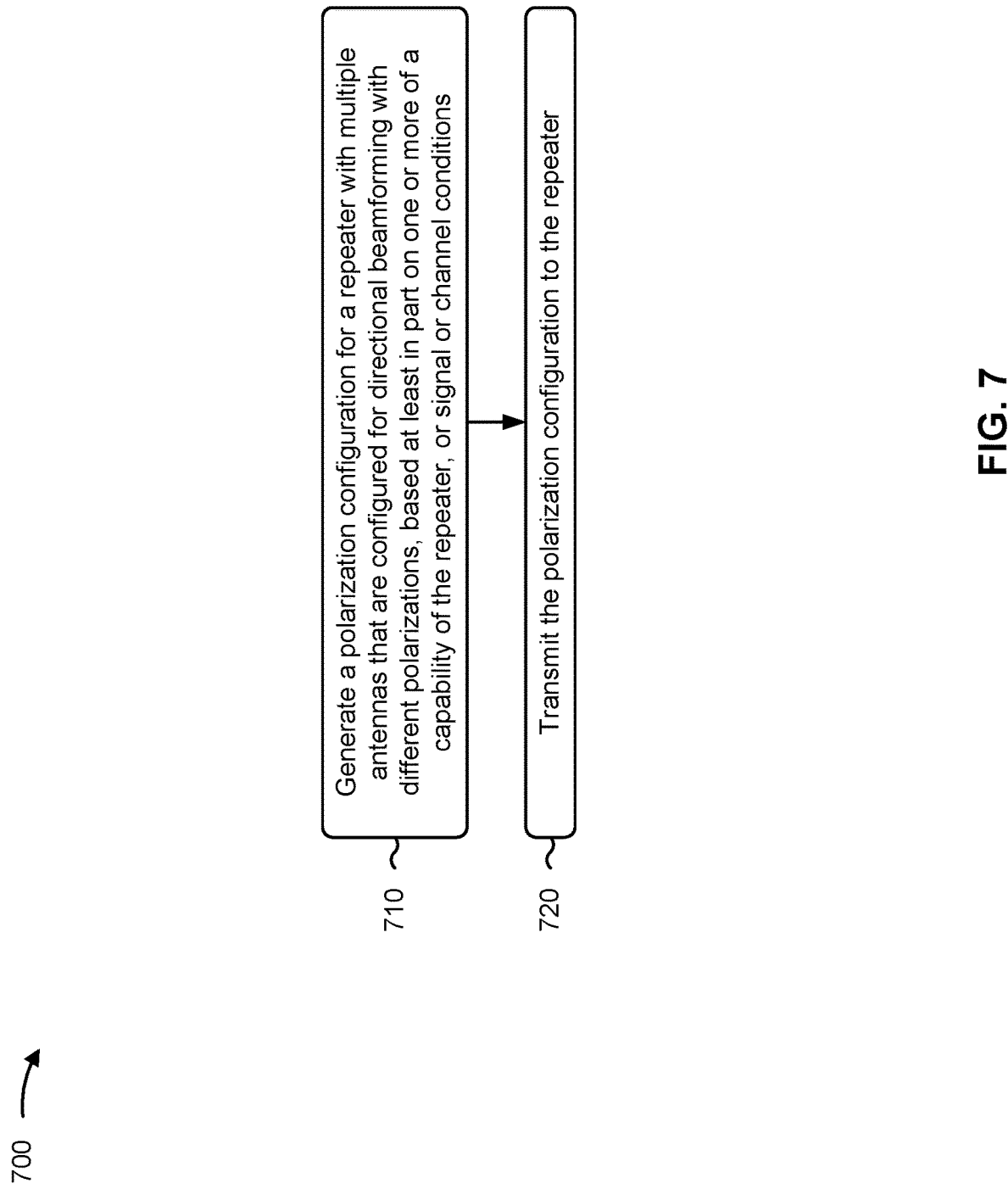
FIG. 7 is a diagram illustrating an example process performed, for example, by a wireless communication device, in accordance with the present disclosure.

FIG. 7 is a diagram illustrating an example process 700 performed, for example, by a wireless communication device, in accordance with the present disclosure. Example process 700 is an example where the wireless communication device (e.g., UE 120 or BS 110 depicted in FIGS. 1-2, a repeater depicted in FIGS. 3-5) performs operations associated with configuring antenna polarization for repeaters.

As shown in FIG. 7, in some aspects, process 700 may include generating a polarization configuration for a repeater with multiple antennas that are configured for directional beamforming with different polarizations, based at least in part on one or more of a capability of the repeater, or signal or channel conditions (block 710). For example, the wireless communication device (e.g., using generation component 908 depicted in FIG. 9) may generate a polarization configuration for a repeater with multiple antennas that are configured for directional beamforming with different polarizations, based at least in part on one or more of a capability of the repeater, or signal or channel conditions, as described above.

As further shown in FIG. 7, in some aspects, process 700 may include transmitting the polarization configuration to the repeater (block 720). For example, the wireless communication device (e.g., using transmission component 904 depicted in FIG. 9) may transmit the polarization configuration to the repeater, as described above.

Process 700 may include additional aspects, such as any single aspect or any combination of aspects described below and/or in connection with one or more other processes described elsewhere herein.

In a first aspect, process 700 includes receiving an indication of a capability of the repeater for configuring polarized antennas.

In a second aspect, alone or in combination with the first aspect, the polarization configuration configures a horizontal chain of the repeater for different beam directions than for a vertical chain of the repeater.

In a third aspect, alone or in combination with one or more of the first and second aspects, the polarization configuration configures one or more of a vertical receive antenna to have a different beam direction than a vertical transmit antenna, or a horizontal receive antenna to have a different beam direction than a horizontal transmit antenna.

In a fourth aspect, alone or in combination with one or more of the first through third aspects, the polarization configuration indicates a threshold of signal or channel conditions that the repeater is to use to configure antennas for receive beams or transmit beams.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
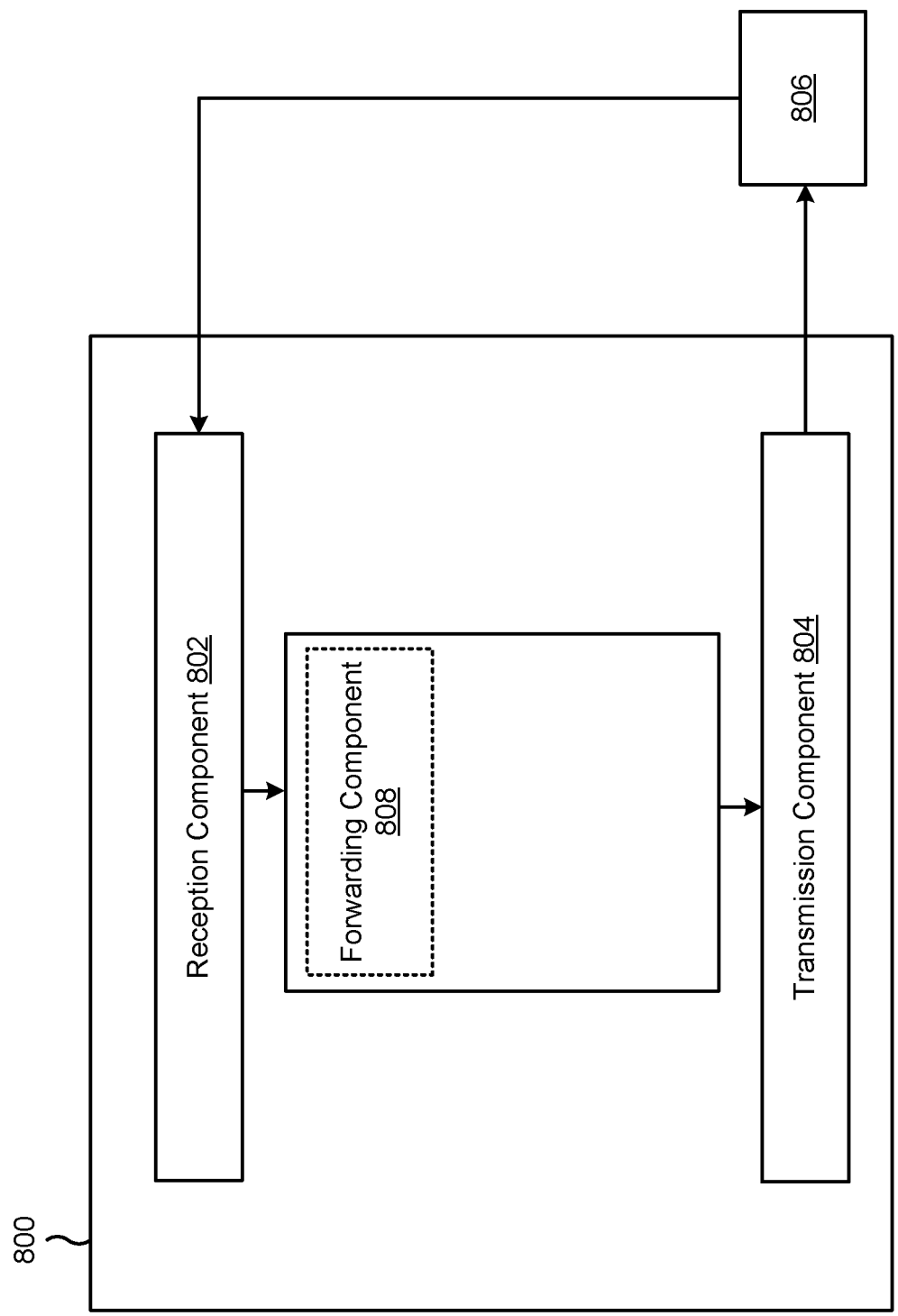
FIGS. 8-9 are block diagrams of example apparatuses for wireless communication, in accordance with the present disclosure.

FIG. 8 is a block diagram of an example apparatus 800 for wireless communication. The apparatus 800 may be a wireless communication device operating as a repeater, or a wireless communication device operating as a repeater may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, another repeater, or another wireless communication device) using the reception component 802 and the transmission component 804. As further shown, the apparatus 800 may include a forwarding component 808, among other examples.

In some aspects, the apparatus 800 may be configured to perform one or more operations described herein in connection with FIGS. 1-5. Additionally, or alternatively, the apparatus 800 may be configured to perform one or more processes described herein, such as process 600 of FIG. 6. In some aspects, the apparatus 800 and/or one or more components shown in FIG. 8 may include one or more components of the wireless communication device described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the wireless communication device described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the wireless communication device described above in connection with FIG. 2. In some aspects, the transmission component 804 may be co-located with the reception component 802 in a transceiver.

The forwarding component 808 may select a polarization configuration for multiple antennas that form beams for forwarding wireless communications between a first wireless device and a second wireless device. The forwarding component 808 may use the reception component 802 and the transmission component 804 to forward wireless communications between the first wireless device and the second wireless device according to the polarization configuration. The forwarding component 808 may include multiple chains of different polarizations with amplifiers and/or filters.

The reception component 802 may receive an indication of the polarization configuration from a control node, where the selecting is based at least in part on the indication. The transmission component 804 may transmit, or the reception component 802 may receive, an indication that the signal or channel conditions do not satisfy the threshold. The transmission component 804 may transmit an indication of a capability of the wireless communication device for configuring polarized antennas.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
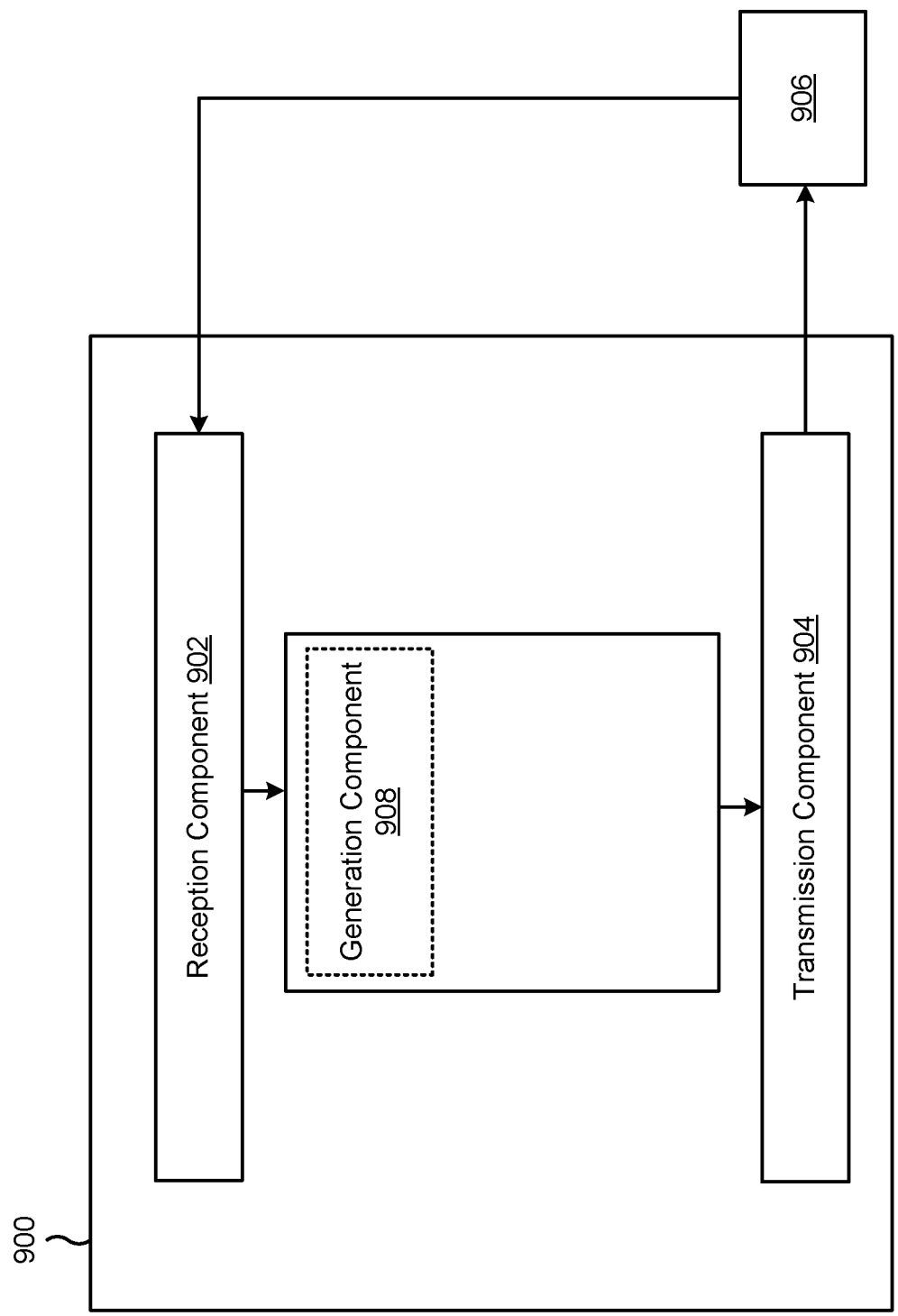

FIG. 9 is a block diagram of an example apparatus 900 for wireless communication. The apparatus 900 may be a wireless communication device operating as a control node or as a device that is providing a polarization configuration, or a wireless communication device operating as a control node or as a device that is providing a polarization configuration may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a repeater, a UE, a base station, or another wireless communication device) using the reception component 902 and the transmission component 904. As further shown, the apparatus 900 may include a generation component 908, among other examples.

In some aspects, the apparatus 900 may be configured to perform one or more operations described herein in connection with FIGS. 1-5. Additionally, or alternatively, the apparatus 900 may be configured to perform one or more processes described herein, such as process 700 of FIG. 7. In some aspects, the apparatus 900 and/or one or more components shown in FIG. 9 may include one or more components of the wireless communication device described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the wireless communication device described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the wireless communication device described above in connection with FIG. 2. In some aspects, the transmission component 904 may be co-located with the reception component 902 in a transceiver.

The generation component 908 may generate a polarization configuration for a repeater with multiple antennas that are configured for directional beamforming with different polarizations, based at least in part on one or more of a capability of the repeater, or signal or channel conditions. The transmission component 904 may transmit the polarization configuration to the repeater. The reception component 902 may receive an indication of a capability of the repeater for configuring polarized antennas.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

The following provides an overview of some Aspects of the present disclosure:

Aspect 1: A method of wireless communication performed by a wireless communication device, comprising: selecting a polarization configuration for multiple antennas that form beams for forwarding wireless communications between a first wireless device and a second wireless device; and forwarding wireless communications between the first wireless device and the second wireless device according to the polarization configuration.

Aspect 2: The method of Aspect 1, further comprising receiving an indication of the polarization configuration from a control node, wherein the selecting is based at least in part on the indication.

Aspect 3: The method of Aspect 1 or 2, wherein the wireless communication device determines the polarization configuration based at least in part on one or more of signal measurements or channel conditions.

Aspect 4: The method of any of Aspects 1-3, wherein the wireless communication device includes: a horizontal chain that includes a horizontal receive antenna that forms a receive beam with a horizontal polarization and a horizontal transmit antenna that forms a transmit beam with the horizontal polarization, and a vertical chain that includes a vertical receive antenna that forms a receive beam with a vertical polarization and a vertical transmit antenna that forms a transmit beam with the vertical polarization, and wherein forwarding the wireless communications includes forwarding the wireless communications using one or more of the horizontal chain or the vertical chain.

Aspect 5: The method of Aspect 4, wherein the polarization configuration configures the horizontal chain for different beam directions than for the vertical chain.

Aspect 6: The method of Aspect 4, wherein the polarization configuration configures one or more of: the vertical receive antenna to have a different beam direction than the horizontal receive antenna, or the vertical transmit antenna to have a different beam direction than the horizontal transmit antenna.

Aspect 7: The method of Aspect 4, wherein forwarding the wireless communications includes forwarding the wireless communications on one of the horizontal chain or the vertical chain based at least in part on signal or channel conditions on the other one of the horizontal chain or vertical chain not satisfying a threshold.

Aspect 8: The method of Aspect 7, further comprising transmitting or receiving an indication that the signal or channel conditions do not satisfy the threshold.

Aspect 9: The method of Aspect 4, wherein forwarding the wireless communications includes: receiving the wireless communications on one of the horizontal chain or the vertical chain; and transmitting the wireless communications on both the horizontal chain and the vertical chain.

Aspect 10: The method of Aspect 4, wherein forwarding the wireless communications includes: receiving and combining the wireless communications on both the horizontal chain and the vertical chain; and transmitting the combined wireless communications on one of the horizontal chain or the vertical chain.

Aspect 11: The method of Aspect 4, wherein forwarding the wireless communications includes: receiving the wireless communications in a single layer on both the horizontal chain and the vertical chain; and transmitting the wireless communications for the single layer on both the horizontal chain and the vertical chain.

Aspect 12: The method of Aspect 4, wherein forwarding the wireless communications includes: receiving the wireless communications in a first signal on the horizontal chain and in a second signal on the vertical chain; and transmitting the wireless communications of the first signal on the vertical chain and of the second signal on the horizontal chain.

Aspect 13: The method of any of Aspects 1-12, further comprising transmitting an indication of a capability of the wireless communication device for configuring polarized antennas.

Aspect 14: A method of wireless communication performed by a wireless communication device, comprising: generating a polarization configuration for a repeater with multiple antennas that are configured for directional beamforming with different polarizations, based at least in part on one or more of a capability of the repeater, or signal or channel conditions; and transmitting the polarization configuration to the repeater.

Aspect 15: The method of Aspect 14, further comprising receiving an indication of a capability of the repeater for configuring polarized antennas.

Aspect 16: The method of Aspect 14 or 15, wherein the polarization configuration configures a horizontal chain of the repeater for different beam directions than for a vertical chain of the repeater.

Aspect 17: The method of any of Aspects 14-16, wherein the polarization configuration configures one or more of: a vertical receive antenna to have a different beam direction than a vertical transmit antenna, or a horizontal receive antenna to have a different beam direction than a horizontal transmit antenna.

Aspect 18: The method of any of Aspects 14-17, wherein the polarization configuration indicates a threshold of signal or channel conditions that the repeater is to use to configure antennas for receive beams or transmit beams.

Aspect 19: An apparatus for wireless communication at a device, comprising a processor; memory coupled with the processor; and instructions stored in the memory and executable by the processor to cause the apparatus to perform the method of one or more Aspects of Aspects 1-18.

Aspect 20: A device for wireless communication, comprising a memory and one or more processors coupled to the memory, the memory and the one or more processors configured to perform the method of one or more Aspects of Aspects 1-18.

Aspect 21: An apparatus for wireless communication, comprising at least one means for performing the method of one or more Aspects of Aspects 1-18.

Aspect 22: A non-transitory computer-readable medium storing code for wireless communication, the code comprising instructions executable by a processor to perform the method of one or more Aspects of Aspects 1-18.

Aspect 23: A non-transitory computer-readable medium storing a set of instructions for wireless communication, the set of instructions comprising one or more instructions that, when executed by one or more processors of a device, cause the device to perform the method of one or more Aspects of Aspects 1-18.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A wireless communication device for wireless communication, comprising:
    a memory; and
    one or more processors operatively coupled to the memory, the one or more processors configured to:
        select a polarization configuration for multiple antennas that form beams for forwarding wireless communications between a first wireless device and a second wireless device;
        receive, from the first wireless device and according to the polarization configuration, wireless communications via a receive beam with a horizontal polarization and a receive beam with a vertical polarization;
        combine the wireless communications from the receive beam with the horizontal polarization and the receive beam with the vertical polarization; and
        transmit, to the second wireless device and via a transmit beam with the horizontal polarization or a transmit beam with the vertical polarization, the combined wireless communications according to the polarization configuration.

2. The wireless communication device of claim 1, wherein the one or more processors are further configured to receive an indication of the polarization configuration from a control node, wherein the selecting is based at least in part on the indication.

3. The wireless communication device of claim 1, wherein the one or more processors are further configured to determine the polarization configuration based at least in part on one or more of signal measurements or channel conditions.

4. The wireless communication device of claim 1, wherein the wireless communication device includes:
    a horizontal chain that includes a horizontal receive antenna that forms the receive beam with the horizontal polarization and a horizontal transmit antenna that forms the transmit beam with the horizontal polarization, and
    a vertical chain that includes a vertical receive antenna that forms the receive beam with the vertical polarization and a vertical transmit antenna that forms the transmit beam with the vertical polarization.

5. The wireless communication device of claim 4, wherein the polarization configuration configures the horizontal chain for different beam directions than for the vertical chain.

6. The wireless communication device of claim 4, wherein the polarization configuration configures one or more of: the vertical receive antenna to have a different beam direction than the horizontal receive antenna, or the vertical transmit antenna to have a different beam direction than the horizontal transmit antenna.

7. The wireless communication device of claim 4, wherein the one or more processors, when transmitting the combined wireless communications, are configured to transmit the combined wireless communications on one of the horizontal chain or the vertical chain based at least in part on signal or channel conditions on the other one of the horizontal chain or vertical chain not satisfying a threshold.

8. The wireless communication device of claim 7, wherein the one or more processors are further configured to transmit or receive an indication that the signal or channel conditions do not satisfy the threshold.

9. The wireless communication device of claim 4, wherein the one or more processors, when transmitting the combined wireless communications, are configured to:
   transmit the combined wireless communications on both the horizontal chain and the vertical chain,
      wherein the wireless communications are received on one of the horizontal chain or the vertical chain.

10. The wireless communication device of claim 4, wherein the one or more processors, when transmitting the combined wireless communications, are configured to:
    transmit the combined wireless communications for a single layer on both the horizontal chain and the vertical chain,
       wherein the wireless communications are received in the single layer on both the horizontal chain and the vertical chain.

11. The wireless communication device of claim 4, wherein the one or more processors, when receiving the wireless communications, are configured to:
    receive the wireless communications in a first signal on the horizontal chain and in a second signal on the vertical chain,
       wherein the combined wireless communication signals include a combination of the first signal and the second signal.

12. The wireless communication device of claim 1, wherein the one or more processors are further configured to transmit an indication of a capability of the wireless communication device for configuring polarized antennas.

13. The wireless communication device of claim 1, wherein the one or more processors, to select the polarization, are configured to:
    select the polarization configuration to configure:
       the receive beam with the horizontal polarization,
       the receive beam with the vertical polarization,
       the transmit beam with the horizontal polarization, and
       the transmit beam with the vertical polarization.

14. A wireless communication device for wireless communication, comprising:
    a memory; and
    one or more processors operatively coupled to the memory, the one or more processors configured to:
       generate a polarization configuration for a repeater with multiple antennas that are configured for directional beamforming with different polarizations, based at least in part on one or more of a capability of the repeater, or signal or channel conditions,
          wherein the polarization configuration is configured to cause the repeater to:
             combine wireless communication signals received from a receive beam with a horizontal polarization and from a receive beam with a vertical polarization, and
             transmit the combined wireless communication signals via a transmit beam with the horizontal polarization or a transmit beam with the vertical polarization; and
       transmit the polarization configuration to the repeater.

15. The wireless communication device of claim 14, wherein the one or more processors are further configured to receive an indication of a capability of the repeater for configuring polarized antennas.

16. The wireless communication device of claim 14, wherein the polarization configuration configures a horizontal chain of the repeater for different beam directions than for a vertical chain of the repeater.

17. The wireless communication device of claim 14, wherein the polarization configuration configures one or more of: a vertical receive antenna to have a different beam direction than a horizontal receive antenna, or a vertical transmit antenna to have a different beam direction than a horizontal transmit antenna.

18. The wireless communication device of claim 14, wherein the polarization configuration indicates a threshold of signal or channel conditions that the repeater is to use to configure antennas for the receive beam with the horizontal polarization, the receive beam with the vertical polarization, the transmit beam with the horizontal polarization, or the transmit beam with the vertical polarization.

19. A method of wireless communication performed by a wireless communication device, comprising:
    selecting a polarization configuration for multiple antennas that form beams for forwarding wireless communications between a first wireless device and a second wireless device;
    receiving, from the first wireless device and according to the polarization configuration, wireless communications via a receive beam with a horizontal polarization and a receive beam with a vertical polarization;
    combining the wireless communications from the receive beam with the horizontal polarization and the receive beam with the vertical polarization; and
    transmitting, to the second wireless device and via a transmit beam with the horizontal polarization or a transmit beam with the vertical polarization, the combined wireless communications according to the polarization configuration.

20. The method of claim 19, further comprising receiving an indication of the polarization configuration from a control node, wherein the selecting is based at least in part on the indication.

21. The method of claim 19, wherein the wireless communication device determines the polarization configuration based at least in part on one or more of signal measurements or channel conditions.

22. The method of claim 19, wherein the wireless communication device includes:
    a horizontal chain that includes a horizontal receive antenna that forms the receive beam with the horizontal polarization and a horizontal transmit antenna that forms the transmit beam with the horizontal polarization, and
    a vertical chain that includes a vertical receive antenna that forms the receive beam with the vertical polarization and a vertical transmit antenna that forms the transmit beam with the vertical polarization, and
    wherein forwarding the wireless communications includes forwarding the wireless communications using one or more of the horizontal chain or the vertical chain.

23. The method of claim 22, wherein the polarization configuration configures the horizontal chain for different beam directions than for the vertical chain.

24. The method of claim 22, wherein the polarization configuration configures one or more of: the vertical receive antenna to have a different beam direction than the horizontal receive antenna, or the vertical transmit antenna to have a different beam direction than the horizontal transmit antenna.

25. The method of claim 22, wherein transmitting the combined wireless communications includes transmitting the wireless communications on one of the horizontal chain or the vertical chain based at least in part on signal or channel conditions on the other one of the horizontal chain or vertical chain not satisfying a threshold.

26. The method of claim 22, wherein transmitting the combined wireless communications includes:
    transmitting the combined wireless communications on both the horizontal chain and the vertical chain,
        wherein the wireless communications are received on one of the horizontal chain or the vertical chain.

27. The method of claim 22, wherein transmitting the combined wireless communications includes:
    transmitting the combined wireless communications for a single layer on both the horizontal chain and the vertical chain,
        wherein the wireless communications are received in the single layer on both the horizontal chain and the vertical chain.

28. The method of claim 22, wherein receiving the wireless communications includes:
    receiving the wireless communications in a first signal on the horizontal chain and in a second signal on the vertical chain,
        wherein the combined wireless communication signals include a combination of the first signal and the second signal.

29. The method of claim 19, wherein selecting the polarization configuration comprises:
    selecting the polarization configuration to configure:
        the receive beam with the horizontal polarization,
        the receive beam with the vertical polarization,
        the transmit beam with the horizontal polarization, and
        the transmit beam with the vertical polarization.

30. A method of wireless communication performed by a wireless communication device, comprising:
    generating a polarization configuration for a repeater with multiple antennas that are configured for directional beamforming with different polarizations, based at least in part on one or more of a capability of the repeater, or signal or channel conditions,
        wherein the polarization configuration is configured to cause the repeater to:
            combine wireless communication signals received from a receive beam with a horizontal polarization and from a receive beam with a vertical polarization, and
            transmit the combined wireless communication signals via a transmit beam with the horizontal polarization or a transmit beam with the vertical polarization; and
    transmitting the polarization configuration to the repeater.

\* \* \* \* \*